United States Patent
Fanta et al.

[15] 3,673,263
[45] June 27, 1972

[54] DIHYDRO-β-SANTALOL AND PROCESS FOR PREPARING DIHYDRO-β-SANTALOL FROM 3-ENDO-METHYL-3-EXO(4'-METHYL-5'-HYDROXYPENTYL) NORCAMPHOR

[72] Inventors: Wayne I. Fanta; William F. Erman, both of Springfield Township, Hamilton County, Ohio

[73] Assignee: The Procter & Gamble Company, Cincinnati, Ohio

[22] Filed: March 29, 1968

[21] Appl. No.: 717,458

[52] U.S. Cl. ...................260/631.5, 252/132, 252/522, 252/539, 252/DIG. 5, 252/DIG. 16
[51] Int. Cl. ...................C07c 35/22, C11d 3/50
[58] Field of Search ...................260/631.5, 617 F

[56] References Cited

UNITED STATES PATENTS 1,593,030  7/1926  Palmer.................260/631.5
3,052,730  9/1962  Eschinszi.............260/631.5

FOREIGN PATENTS OR APPLICATIONS 210,574  8/1960  Austria...............260/631.5

OTHER PUBLICATIONS

Herout et al., " Chem. Abstracts," Vol. 51, (1957), Col. 296–297.

Bhattacharyya, " J. Indian Chem. Soc.," Vol. 21, (1944), pages 337 to 339.
Simonsen, " The Terpenes," 2nd. ed., Vol. III, (1952), p. 185.
" The Merck Index," 6th ed. (1952), pp. 253, 457.
Komppa, " Berichte der Deutschen Chemischen Gesellschaft," (1944), pp. 1– 13.
Wagner et al., " Synthetic Organic Chemistry," (1953), p. 32.
Pinder, " The Chemistry of the Terpenes," (1960), pp. 50–51.
Kharasch et al., " Grynard Reactions of Nonmetallic Substances," (1954), pp. 3, 16, 17, 22– 25, 143– 146, 322.

Primary Examiner—Leon Zitver
Assistant Examiner—Joseph E. Evans
Attorney—Richard C. Witte and Julius P. Filcik

[57] ABSTRACT

The novel compound, dihydro-β-santalol, and a process for preparing dihydro-β-santalol from 3-endo-methyl-3-exo(4'-methyl-5'-hydroxypentyl)norcamphor comprising the steps of (1) reacting 3-endo-methyl-3-exo(4'-methyl-5'-hydroxypentyl)norcamphor with an organometallic compound, (2) hydrolyzing the reaction product of Step 1, and (3) selectively dehydrating the hydrolyzed reaction product of Step 2 with a compound selected from the group consisting of Lewis acids, oxalic acid, p-toluenesulfonic acid, sulfuric acid, hydrochloric acid, and hydrobromic acid to obtain dihydro-β-santalol.

7 Claims, No Drawings

DIHYDRO-β-SANTALOL AND PROCESS FOR PREPARING DIHYDRO-β-SANTALOL FROM 3-ENDO-METHYL-3-EXO(4'-METHYL-5'-HYDROXYPENTYL) NORCAMPHOR

FIELD OF THE INVENTION

This invention relates to a process for obtaining dihydro-β-santalol, a novel compound having a valuable sandalwood odor, from 3-endo-methyl-3-exo(4'-methyl-5'-hydroxypentyl)norcamphor. More specifically, this process relates to the preparation of dihydro-β-santalol by reacting 3-endo-methyl-3-exo(4'-methyl-5'-hydroxypentyl)norcamphor with an organometallic compound and, subsequently, hydrolyzing the reaction product thereof to obtain the diol, 2-exo-3-endo-dimethyl-3-exo(4'-methyl-5'-hydroxypentyl)norborneol, and selectively dehydrating the diol with a Lewis acid, oxalic acid, p-toluenesulfonic acid, sulfuric acid, hydrochloric acid or hydrobromic acid to obtain dihydro-β-santalol.

HISTORY OF THE INVENTION

East Indian sandalwood oil has heretofore been available only from East Indian sandalwood trees. This oil and various individual components of the oil are highly valued perfume bases and are used in large quantities throughout the perfume industry. The oil, however, is expensive and is in limited and sometimes sporadic supply. For this reason, a continuous effort has been made to synthesize various components of the oil or similar synthetic materials which possess the desirable woody fragrance of sandalwood oil.

The process presented herein for preparing dihydro-β-santalol from 3-endo-methyl-3-exo(4'-methyl-5'-hydroxypentyl)norcamphor and the novel compound, dihydro-β-santalol, represent a portion of an extensive scientific effort to obtain dihydro-β-santalol. Other processes and novel intermediate compounds relating to the synthesis of dihydro-β-santalol are described in the following copending U.S. Patent applications which were filed simultaneously herewith: Fanta and Erman, 3 endo-Methyl 3 -exo (4'-methyl-5'-hydroxpentyl) norcamphor and 2-methyl-5-bromophentanol, and Process for the Preparation of These Compounds, Ser. No. 717,360, filed Mar. 29, 1968, now U.S. Pat. No. 3,579,479; Fanta and Erman, Tetrahydropyranyl Ether Compounds and Process for the Preparation of these Compounds and 3-endo-methyl-3-exo (4'-5-'-hydroxpentyl) norcamphor, Ser. No. 717,384, filed Mar. 29, 1968, now abandoned; Fanta and Erman, Preparation of 3-endo-methyl-3-exo (4'-methyl-5'hydroxypentyl) norcamphor from 2-methyl-4-pentenol, Ser. No. 717,362, filed Mar. 29, 1968, now U.S. Pat. No. 3,580,953; Fanta and Erman, Preparation of 3-endo-methyl-3-exo (4'-methyl-5 'hydroxy-pentyl) norcamphor from 2-methyl-4-pentenol, Ser. No. 717,374, filed Mar. 29, 1968, now U.S. Pat. No. 3,580,954.

SUMMARY OF THE INVENTION

The process of this invention comprises the steps of:

1. reacting 3-endo-methyl-3-exo(4'-methyl-5'-hydroxypentyl)norcamphor having the general formula

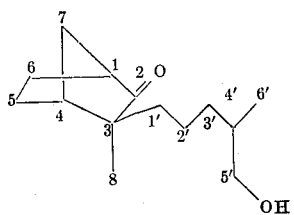

with an organometallic compound selected from the group consisting of methyl Grignards and methylmetallic compounds to obtain an organometallic salt of 2-exo-3-endo-dimethyl-3-exo(4'-methyl-5'-hydroxypentyl)norborneol having the general formula

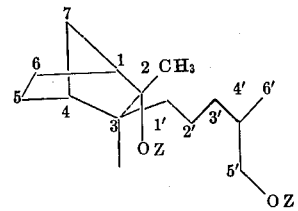

wherein Z is selected from the group of cations consisting of sodium, potassium, lithium, magnesium bromide, magnesium iodide, and magnesium chloride;

2. hydrolyzing the reaction product of Step 1 to obtain 2-exo-3-endo-dimethyl-3-exo(4'-methyl-5'-hydroxypentyl)norborneol having the general formula

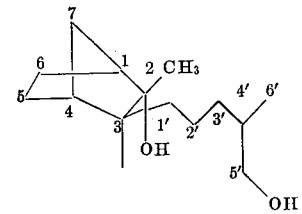

and 3. dehydrating 2-exo-3-endo-dimethyl-3-exo(4'-methyl-5'-hydroxypentyl)norborneol with a compound selected from the group consisting of Lewis acids, oxalic acid, p-toluenesulfonic acid, sulfuric acid, hydrochloric acid, and hydrobromic acid to obtain dihydro-β-santalol having the general formula

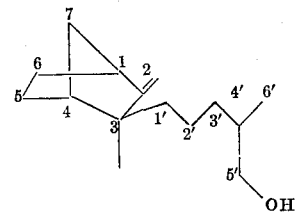

This invention also encompasses the novel compound, dihydro-β-santalol. Dihydro-β-santalol possesses a desirable, woody sandalwood fragrance and, thus, has specific utility as a perfume component.

DESCRIPTION OF DIHYDRO-β-SANTALOL AND PROCESS FOR PREPARING DIHYDRO-β-SANTALOL

The initial starting compound for this process, 3-endo-methyl-3-exo(4'-methyl-5'-hydroxypentyl)norcamphor, and processes for preparing this compound are the subject of the aforementioned abandoned application and U.S. Patents. (The U.S. Patents are incorporated by reference herein.) 3-endo-Methyl-3-exo(4'-methyl-5'-hydroxypentyl)norcamphor can be prepared for use herein by any one of the processes described above.

The first step of this process comprises reacting 3-endo-methyl-3-exo(4'-methyl-5'-hydroxypentyl)norcamphor having the general formula

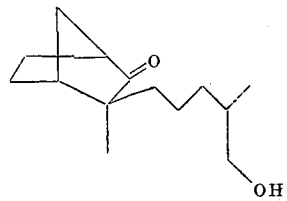

with an organometallic compound to obtain an organometallic salt of 2-exo-3-endo-dimethyl-3-exo(4'-methyl-5'-hydroxypentyl)norborneol having the general formula

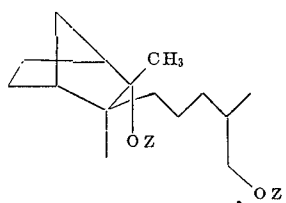

wherein Z is selected from the group of cations consisting of sodium, potassium, lithium, magnesium bromide, magnesium iodide, and magnesium chloride.

The organometallic compounds suitable for use in Step 1 are selected from the group consisting of methyl Grignards, i.e., methyl magnesium bromide, methyl magnesium iodide, methyl magnesium chloride, and methylmetallic compounds, i.e., methyllithium, methylsodium and methylpotassium. Methyl magnesium bromide, methyl magnesium chloride, and methyllithium are preferred for use herein.

A solvent is utilized in this step to dissolve the organometallic compound and the 3-endo-methyl-3-exo(4'-methyl-5'-hydroxypentyl)norcamphor. Solvents which are suitable for use herein include diethyl ether, tetrahydrofuran, dioxane, 1,2-dimethoxyethane and bis-(2-methoxyethyl)ether.

In this first step, a reaction mixture is prepared containing 3-endo-methyl-3-exo(4'-methyl-5'-hydroxypentyl) nor-camphor, an organometallic compound (methyl Grignard or methylmetallic compound) and a solvent. Both the methyl Grignards and the methylmetallic compounds should be used in a molar ratio of organometallic compound to 3-endo-methyl-3-exo(4'-methyl-5'-hydroxypentyl)norcamphor of at least 2:1 to fully utilize the norcamphor compound. In most cases, however, the organometallic compounds are used in molar excess. Methyl Grignards are used in a molar ratio of methyl Grignard to 3-endo-methyl-3-exo(4'-methyl-5'-hydroxypentyl) norcamphor of from about 2:1 to about 6:1 while the methyl-metallic compounds are used in a molar ratio of methylmetallic compound to 3-endo-methyl-3-exo(4'-methyl-5'-hydroxypentyl) norcamphor of from about 2:1 to about 5:1.

The solvent is used in sufficient amounts to dissolve the organometallic compound as well as the 3-endo-methyl-3-exo(4'-methyl-5'-hydroxypentyl)norcamphor. The solvent is generally used in a weight ratio of solvent to 3-endo-methyl-3-exo(4'-methyl-5'-hydroxypentyl)norcamphor of from about 5:1 to about 40:1, preferably from about 20:1 to about 25:1. The solvent can be used in larger or smaller quantities than those designated above; however, no advantage is gained.

The molar excess of organometallic compound which should be utilized is dependent to some extent on the solvent being used. When the intermediate organometallic salts, i.e., those compounds in which the reactive ketone site has not been altered having the following general formula

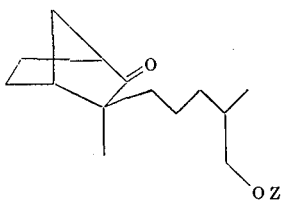

wherein Z is selected from the group of cations consisting of sodium, potassium, lithium, magnesium bromide, magnesium iodide, and magnesium chloride, are only slightly soluble in a particular solvent, a large excess of the organometallic compound is generally used. Conversely, when the intermediate organometallic salts are quite soluble in a particular solvent, a smaller excess of the organometallic compounds is utilized.

The reaction mixture comprising 3-endo-methyl-3-exo(4'-methyl-5'-hydroxypentyl)norcamphor, organometallic compound, and solvent is allowed to react for from about one to about 24 hours at temperatures ranging from about 15° to 120° C. When a methyl Grignard is utilized herein, the reaction mixture is generally refluxed for from about 4 to 20 hours to obtain good yields. When the methylmetallic compounds are utilized, the reaction will generally proceed to completion at room temperature in from about 2 to about 10 hours. The reaction time, of course, is influenced by the reaction conditions, the solvents being used, the particular organometallic compound being used, molar ratios of components, and the heat applied to the reaction.

Although this reaction will proceed in air, it is preferred that an inert reaction atmosphere be utilized in Step 1. The inert atmosphere can be comprised of nitrogen, argon or other gas which is essentially free of oxygen and does not react with the above described reactants.

The reaction is allowed to proceed until both reactive sites of 3-endo-methyl-3-exo(4'-methyl-5'-hydroxypentyl) norcamphor, i.e., the ketone and hydroxyl sites, have reacted to form the organometallic salts, generally from about one to about 24 hours. The optimum reaction time for particular components, concentrations and reaction conditions can be determined easily by pouring a portion of the reaction mixture into water at a predetermined point in time. The water hydrolyzes the organometallic salts and then infrared spectroscopy techniques can be used to determine whether diol formation, i.e., 2-exo-3-endo-dimethyl-3-exo(4'-methyl-5'-hydroxypentyl)norborneol formation, is complete. Several short experiments can be run to find the optimum reaction times for particular reactants and reaction conditions. The compound obtained before hydrolysis (Step 2) has the following general formula

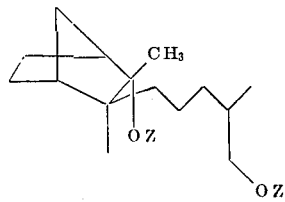

wherein Z is selected from the group of cations consisting of sodium, potassium, lithium, magnesium bromide, magnesium iodide, and magnesium chloride.

In a preferred embodiment, sodium hydride or sodium metal can be substituted for a portion of the organometallic compound to lower the cost of this process. The solvents described above are suitable for use in this preferred embodiment. Sodium metal or sodium hydride, when allowed to react with 3-endo-methyl-3-exo(4'-methyl-5'-hydroxypentyl) norcamphor at temperatures ranging from 15° to 120° C. for from about 1 to about 6 hours will form the primary sodium salts at the reactive hydroxyl site but will not react appreciably at the ketone site. From about 0.9 to about 1.1 moles of sodium metal or sodium hydride are generally utilized per mole of 3-endo-methyl-3-exo(4'-methyl-5'-hydroxypentyl)norcamphor before the organometallic compounds are added to the reaction mixture. In this preferred embodiment, the number of moles of organometallic compound used can be decreased from that previously described by the number of moles of sodium metal or sodium hydride utilized herein per mole of 3-endo-methyl-3-exo(4'-methyl-5'-hydroxypentyl)norcamphor.

The second step of this process comprises hydrolyzing the reaction product of Step 1 to obtain the diol, 2-exo-3-endo-dimethyl-3-exo(4'-methyl-5'-hydroxypentyl)norborneol, having the general formula

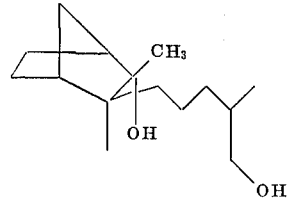

Small amounts of the reaction product of Step 1 are preferably hydrolyzed to the diol by carefully pouring the reaction product of Step 1 (which has been cooled to 0° to 25°) into an excess of water, preferably cold water or ice. The reaction product above described is quickly hydrolyzed and the diol, 2-exo-3-endo-dimethyl-3-exo(4'-methyl-5'-hydroxypentyl) norborneol, and alkali metal hydroxides or magnesium halohydroxides are formed. The magnesium halohydroxides can be brought into solution by addition of solid ammonium chloride or dilute, i.e., less than 5 percent, hydrochloric acid. Solubilization of these salts enhances the ease of extracting the diol from the reaction mixture. The diol may be slightly soluble in water; therefore, it is desirable that the water be saturated with a salt, for example, sodium sulfate, sodium chloride or ammonium chloride to prevent loss of the diol. The diol can be recovered by extracting the water-product mixture several times with diethyl ether and then washing the combined extracts with a saturated solution of, for example, sodium sulfate, sodium chloride or sodium bicarbonate. Any water remaining in the separated diethyl ether solution can be removed in any convenient manner, for example, with magnesium sulfate. The crude diol can be obtained by removing the solvent by any convenient method, e.g., by distillation under reduced pressure. This crude 2-exo-3-endo-dimethyl-3-exo(4'-methyl-5'-hydroxypentyl)norborneol can be utilized in Step 3 of this process or it can be further purified by distillation before use in Step 3.

Larger amounts of the reaction product of Step 1 are preferably hydrolyzed by the cautious, gradual addition thereto of a small amount of water or a saturated aqueous solution of, for example, sodium sulfate or sodium chloride. The water or saturated aqueous solution is added slowly to the reaction product of Step 1 to salt out the inorganic salts. When this reaction mixture clears due to precipitation of the inorganic salts, the solvent layer containing the diol is drawn off. The residual salts can then be washed several times, generally with water, to obtain all of the diol. The washes are added to the original solvent layer and any water remaining in the either solution is removed by using a conventional drying agent. The crude diol can be obtained by removing the solvent, e.g., by distillation under reduced pressure.

The third step of this process comprises selectively dehydrating the reaction product of Step 2, 2-exo-3-endo-dimethyl-3-exo(4'-methyl-5'-hydroxypentyl)norborneol, with a compound selected from the group consisting of Lewis acids, oxalic acid, p-toluenesulfonic acid, sulfuric acid, hydrochloric acid and hydrobromic acid to obtain dihydro-β-santalol having the general formula

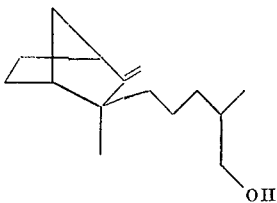

Any Lewis acid can be utilized in this step to convert 2-exo-3-endo-dimethyl-3-exo(4'-methyl-5'-hydroxypentyl)norborneol, i.e., the reaction product of Step 2, to dihydro-β-santalol. Among the Lewis acids suitable for use herein are aluminum chloride, boron trifluoride, stannic chloride, zinc chloride, ferric chloride, titanium tetrachloride, zinc bromide, magnesium bromide, and boron tribromide. Particularly preferred for use herein is boron trifluoride.

A solvent is utilized in this step to dissolve the Lewis acid and the 2-exo-3-endo-dimethyl-3-exo(4'-methyl-5'-hydroxypentyl)norborneol obtained from Step 2. The solvent most generally used and preferred for use herein is diethyl ether. Other solvents can, however, be utilized herein, for example, benzene, toluene, tetrahydrofuran, 1,2-dimethoxyethane, bis-(2-methoxyethyl)ether and dioxane are suitable for use in this process.

A reaction mixture comprising the 2-exo-3-endo-dimethyl-3-exo(4'-methyl-5'-hydroxypentyl)norborneol, a Lewis acid, and a solvent is prepared. The Lewis acid is utilized herein in a mole ratio of Lewis acid to 2-exo-3-endo-dimethyl-3-exo(4'-methyl-5'-hydroxypentyl)norborneol of from about 0.25:1 to about 1:1. Generally, from about 700 ml. to about 1,500 ml. of solvent per mole of diol is also used herein.

This reaction mixture is maintained at temperatures ranging from 15° to 100° C., preferably at the reflux temperature of the solvent, for from 1 to 24 hours. The tertiary hydroxyl group of the diol is attacked preferentially by the Lewis acid with concomitant dehydration and dihydro-β-santalol is formed. There is little or no conversion of the primary hydroxyl group, i.e., dehydration, to afford the primary unsaturated alkene. The reaction time, of course, is influenced by the reaction conditions, the solvent being used, the particular Lewis acid being used, molar ratio of components and the heat applied to the reaction. The course of this reaction can be monitored by vapor phase chromatography.

The dihydro-β-santalol can be removed from the reaction product of Step 3 by any convenient method. The following procedure is particularly suited for removing dihydro-β-santalol from the reaction product of Step 3. A dilute solution of a base e.g., KOH, NaOH, NaHCO₃, Na₂CO₃) is added to the reaction mixture to decompose any acidic materials. Ether or other suitable solvent is then utilized to extract the dihydro-β-santalol from the reaction mixture. The ether extracts are washed with saturated aqueous solutions of, for example, salt, and then dried in any convenient manner. The ether is removed by distillation at reduced pressure to obtain dihydro-β-santalol. The dihydro-β-santalol can be further purified by distillation if that is desired.

2-exo-3-endo-Dimethyl-3-exo(4'-methyl-5'-hydroxypentyl)norborneol can also be selectively dehydrated by reacting the diol with an aqueous solution of oxalic acid, p-toluenesulfonic acid, sulfuric acid, hydrochloric acid or hydrobromic acid. The organic acids, i.e., oxalic acid and p-toluenesulfonic acid, are preferred for use herein because better yields of dihydro-β-santalol are obtainable with the organic acids than with the mineral acids, i.e., sulfuric acid, hydrochloric acid and hydrobromic acid. Saturated aqueous solutions of the organic acids are generally used herein; however, aqueous organic acid solutions containing as little as 1 percent oxalic acid or p-toluenesulfonic acid by weight of the acid solution can be used herein. The mineral acids, i.e., sulfuric acid, hydrochloric acid, and hydrobromic acid, should be utilized in aqueous solution containing from 1 to 5 percent mineral acid by weight of the solution. These acids will selectively dehydrate the diol and form dihydro-β-santalol. The oxalic acid, p-toluenesulfonic acid, sulfuric acid, hydrochloric acid and hydrobromic acid are utilized herein in a mole ratio of acid to diol of from 0.5:1 to 20:1. This reaction mixture is allowed to react for from about 1 to about 24 hours while being maintained at temperatures ranging from 15° to 100° C. The dihydro-β-santalol can be removed from this reaction mixture by extraction or by steam distillation, i.e., admitting steam into the reaction mixture, condensing the vapors and removing the dihydro-β-santalol from the condensed vapors, generally by extraction with ether.

Steps 2 and 3 can be performed simultaneously by adding an aqueous solution of organic acid or mineral acid under the conditions and in the amounts described above to the reaction product of Step 1. The reaction product of Step 1 is then hydrolyzed and selectively dehydrated to form dihydro-β-santalol in a single step.

The novel compound, dihydro-β-santalol, prepared by the process of this invention has a powerful, long lasting highly desirable odor characterized as strong sandalwood. This compound is more stable to air oxidation than most sandalwood oil components and therefore retains its odor characteristics for longer time periods than does natural sandalwood oil. This compound can be substituted for East Indian sandalwood oil in many perfume compounds and is especially valuable because of its stability when used as a component of perfume compositions in products such as soaps, detergents, deodorants and the like. Dihydro-β-santalol is utilized in perfume compositions in odoriferously effective amounts, e.g., 0.0001 to about 50 percent by weight. More specific illustrations of the perfume utility of this compound are found in Examples III to V hereinafter.

EXAMPLES

The following examples illustrate specific preferred embodiments of this invention and are not intended to be limiting. All percentages and ratios in the following examples, as well as in the specification and in the appended claims, are by weight unless otherwise indicated. Temperatures are expressed in degrees centigrade.

Data listed in all of the examples were obtained by means of the following techniques unless otherwise indicated. The apparatus described by Johnson et al. "β-Carbethoxy-γ,γ-Diphenylvinylacetic Acid," *Organic Syntheses*, 30, p. 18 (1959), was used to maintain a nitrogen atmosphere. Infrared spectra were determined on a Perkin-Elmer Model 137 Spectrophotometer; ultraviolet spectra were determined in ethanol on a Perkin-Elmer Model 202 Spectrophotometer. Nuclear magnetic resonance (n.m.r.) spectra were determined in carbon tetrachloride with a Varian Model HA-100 Spectrometer with chemical shifts measured relative to tetramethylsilane (10 τ). The n.m.r. data are noted by chemical shift, integration, multiplicity, coupling constant (in Hz), and assignment. Gas-liquid chromatography was accomplished with an Aerograph Model 202B using a flow rate of 100 ml./min. on 5-ft. by 0.25-in. columns packed with (A) 20 percent FFAP (Carbowax 20M terminated with nitro-terephthalic acid) on 60/80 mesh Chromosorb P or (B) 20 percent SE 30 (a methyl silicone gum rubber compound) on 60/80 mesh Chromosorb W.

EXAMPLE I

Preparation of dihydro-β-santalol from 3-endo-methyl-3-exo(4'-methyl-5'-hydroxypentyl)norcamphor A. Preparation of 3-endo-methyl-3-exo(4'-methyl-5'-hydroxypentyl)norcamphor The starting compound for this invention, 3-endo-methyl-3-exo(4'-methyl-5'-hydroxypentyl)norcamphor is prepared according to the process set forth in Example I of U.S. Pat. NO. 3,579,479.

In this process, 2-methyl-4-pentenol is borated with boric acid to form tri(2-methyl-4-pentenyl)borate. The borate is hydrobrominated by a free radical addition and then hydrolyzed to obtain 2-methyl-5-bromopentanol. The bromopentanol is borated with boric acid and, subsequently, this product is reacted with the enolate of 3-methylnorcamphor and then hydrolyzed to form 3-endo-methyl-3-exo(4'-methyl-5'-hydroxypentyl)norcamphor.

B. Preparation of 2-exo-3-endo-dimethyl-3-exo(4'-methyl-5'-hydroxypentyl)norborneol (Steps 1 and 2)

A 250 ml. flask fitted with a mechanical stirrer and addition funnel was charged with 33 ml. of 3M ethereal methyl magnesium bromide solution (0.10 mole) and 100 ml. (71.5 g.) of diethyl ether. A nitrogen atmosphere was introduced and a solution of 5.6 g. (0.025 mole) of 3-endo-methyl-3-exo(4'-methyl-5'-hydroxypentyl)norcamphor in 50 ml. (35.8 g.) of diethyl ether was added over 15 minutes. The resulting mixture was stirred rapidly at reflux for five hours. The reaction product was hydrolyzed by the cautious dropwise addition of 20 ml. of an aqueous saturated sodium sulfate solution. The ethereal layer was drawn off and the remaining semi-solid, inorganic material was washed well with several portions of ether. The combined organic layers were washed once with an aqueous sodium sulfate solution, dried over magnesium sulfate, and the solvent was removed by distillation to afford 7.7 g. of viscous oil. Distillation gave 5.58 g. (93 percent) of 2-exo-3-endo-dimethyl-3-exo(4'-methyl-5'-hydroxypentyl)norborneol, b.p. 132° (0.18 mm.) which showed 95 percent purity by gas-liquid partition chromatography. Material purified by gas-liquid partition chromatography exhibited $n_D^{26.5}$ 1.5019, $\lambda_{max}^{film}$ 2.97, 7.31, 8.87, 9.69, 10.51, 10.60, 11.04 μ, n.m.r. signals at τ 6.50-6.85 ($CH_2OH$), 8.82 ($HOCCH_3$), 9.12 (doublet J = 6Hz, $CHCH_3$), 9.16 ($CH_3$).

Anal. Calculated for $C_{15}H_{28}O_2$: C, 74.95; H, 11.74. Found: C, 74.96; H, 11.87.

Results substantially similar to those achieved in the above reaction are obtained when the following organometallic compounds are substituted for methyl magnesium bromide on an equimolar basis: methyl magnesium iodide, methyl magnesium chloride, methyllithium, methylsodium and methylpotassium.

Results substantially similar to those achieved in the above reaction are obtained when the following solvents are substituted for diethyl ether on an equal weight basis: tetrahydrofuran, dioxane, 1,2-methoxyethane and bis-(2-methoxyethyl)ether.

C. Preparation of dihydro-β-santalol from 2-exo-3-endo-dimethyl-3-exo-(4'-methyl-5'-hydroxypentyl)norborneol A dry 50 ml. flask fitted with condenser and septum was charged with a solution containing 5.58 g. (0.023 mole) of 2-exo-3-endo-dimethyl-3-exo(4'-methyl-5'-hydroxypentyl)norborneol in 23 ml. of anhydrous diethyl ether. A nitrogen atmosphere was introduced and 2.3 ml. of a 47 percent boron trifluoride etherate (0.019 mole) solution was added as rapidly as possible. The resulting dark solution was refluxed for two hours and cautiously added to an excess of saturated aqueous sodium bicarbonate solution. The ether layer was removed and the aqueous solution was extracted with ether. The ether extracts were combined with the original ether layer and washed with two portions of brine. The ether solution was dried with magnesium sulfate. Subsequent solvent removal afforded 6.27 g. of light yellow oil which on distillation gave 4.55 g. (87 percent) of colorless dihydro-β-santalol which showed 98 percent purity by gas-liquid partition chromatography and which had a desirable, strong sandalwood odor. Dihydro-β-santalol could be further purified by column chromatography (Florisil-elution with 2-5 percent ether in hexane) or redistillation, b.p. 106°-107° (0.1 mm.), on larger scale. Material purified by gas-liquid partition chromatography exhibited $n_D^{26}$ 1.4920, $\lambda_{max}^{film}$ 3.00, 3.29, 6.03, 7.31, 9.01, 9.65, 11.37 μ, n.m.r. signals at τ= 5.32, 5.59 (2H, C = $CH_2$), 5.89 (1H, OH), 6.50-6.90 (2H, $CH_2OH$), 7.38 (1H, $C_1$—H), 7.94 (1H, $C_4$—H), 9.00 ($CH_3$), 9.13 (doublet, J = 7 Hz, $CHCH_3$).

Anal. Calculated for $C_{15}H_{26}O$: C, 81.02; H, 11.79. Found: C, 80.88; H, 11.75. Molecular Weight (mass spectrum): Calculated, 222. Found, 222.

Results substantially similar to those achieved in the above reaction are obtained when the following Lewis acids are substituted for boron trifluoride: aluminum chloride, stannic chloride, zinc chloride, ferric chloride, titanium tetrachloride, zinc bromide, magnesium bromide and boron tribromide.

Results substantially similar to those achieved in the above reaction are obtained when the following solvents are substituted for diethyl ether is Step 3: benzene, toluene, tetrahydrofuran, dioxane, 1,2-dimethoxymethane and bis-(2-methoxyethyl)ether.

EXAMPLE II

Preparation of dihydro-β-santalol from 3-endo-methyl-3-exo(4'-methyl-5'-hydroxypentyl)norcamphor A. Preparation of 3-endo-methyl-3-exo-(4'-methyl-5'-hydroxypentyl)norcamphor The starting compound for this invention, 3-endo-methyl-3-exo(4'-methyl-5'-hydroxypentyl)norcamphor is prepared according to the process set forth in U.S. Pat. No. 3,579,479. In this process, 2-methyl-4-pentenol is borated with boric acid to form tri(2-methyl-4-pentenyl)borate. The borate is hydrobrominated by a free radical addition and then hydrolyzed to obtain 2-methyl-5-bromopentanol. The bromopentanol is borated with boric acid and subsequently, this product is alkylated with the enolate of 3-methylnorcamphor and the hydrolyzed to form 3-endo-methyl-3-exo(4'-methyl-5'-hydroxypentyl)norcamphor.

B. Preparation of 2-exo-3-endo-dimethyl-3-exo(4'-methyl-5'-hydroxypentyl)norborneol (Steps 1 and 2)

A 250 ml. flask fitted with a mechanical stirrer and addition funnel was charged with 1.0 g. (0.025 mole) of a 60 percent sodium hydride mineral oil dispersion and 50 ml. (52.5 g.) of tetrahydrofuran. A solution of 5.6 g. (0.025 mole) of 3-endo-methyl-3-exo(4'-methyl-5'-hydroxypentyl)norcamphor in 25 ml. (26.3 g.) of tetrahydrofuran was added slowly to the flask. The resulting heterogeneous mixture was heated to reflux for one hour. The reaction mixture was cooled slightly and 12.5 ml. of 3M methyl magnesium chloride solution (0.038 mole) in tetrahydrofuran was slowly added. The reaction mixture was heated at reflux for three hours. The cooled reaction mixture was hydrolyzed with 30 ml. of a saturated aqueous solution of sodium sulfate. The tetrahydrofuran layer was decanted and the remaining solid, inorganic material was washed well with several portions of diethyl ether. The combined organic layers were dried with magnesium sulfate and the solvent was removed to afford 7.21 g. of crude 2-exo-3-endo-dimethyl-3-exo(4'-methyl-5'-hydroxypentyl)norborneol which on purification had the characteristics described in Paragraph B of Example I.

Results substantially similar to those achieved in the above reaction are obtained when sodium metal is substituted on an equimolar basis for sodium hydride and when the following organometallic compounds are substituted on an equimolar basis for methyl magnesium chloride: methyl magnesium bromide, methyl magnesium iodide, methyllithium, methylsodium, and methylpotassium. Substantially similar results are also obtained when the following solvents are substituted for tetrahydrofuran: diethyl ether, dioxane, 1,2-methoxyethane, and bis-(2-methoxyethyl)ether.

C. Preparation of dihydro-β-santalol from 2-exo-3-endo-dimethyl-3-exo(4'-methyl-5'-hydroxy-pentyl)norborneol (Step 3)

A three-necked 1,000 ml. flask fitted with a steam inlet, an addition funnel, and a condenser was charged with 6.80 g. (0.028 mole) of 2-exo-3-endo-dimethyl-3-exo(4'-methyl-5'-hydroxypentyl)norborneol and 100 ml. of a saturated aqueous oxalic acid solution (ca. 20 g. oxalic acid dihydrate, 0.16 moles). Steam was introduced into the flask and 1,000 ml. of distillate were collected over about a one hour period. The distillate was saturated with sodium chloride and extracted with ether. The ether extracts were dried with magnesium sulfate and the ether was removed by distillation to afford 2.3 g. of crude dihydro-β-santalol.

The residue remaining in the flask was also saturated with sodium chloride and extracted with ether. The ether extracts were dried and the ether removed to afford 3.12 g. of crude dihydro-β-santalol.

The above portions of crude dihydro-β-santalol were combined and redistilled to afford 4.42 g. of dihydro-β-santalol.

The dihydro-β-santalol had the characteristics described in Part C of Example I.

Substantially the same results are obtained when p-toluenesulfonic acid is substituted on an equimolar basis for oxalic acid. Aqueous solutions (about 4 percent) of sulfuric acid, hydrochloric acid or hydrobromic acid can also be substituted for the oxalic acid used above with substantially the same results.

EXAMPLE III

Perfume Compositions

Perfume compositions containing dihydro-β-santalol are prepared by intermixing the components shown below. The compositions exhibit highly desirable and useful odors.

Composition A – Narcissus

| Component | Percent by Weight |
| --- | --- |
| Dihydro-β-santalol | 10.00 |
| Neroli oil | 4.00 |
| Vetivert oil | 12.50 |
| Isobutyl salicylate | 14.50 |
| Phenylacetic aldehyde | 5.00 |
| Paracresyl acetate | 20.00 |
| Ylang ylang | 8.50 |
| Heliotropin | 5.50 |
| Cinnamic alcohol | 20.00 |

Composition B – Chypre

| Component | Percent by Weight |
| --- | --- |
| Essence oakmoss | 5.00 |
| Bergamot oil | 22.50 |
| Vetivert oil | 7.50 |
| Oil of lavender | 5.00 |
| Dihydro-β-santalol | 7.00 |
| Patchouli | 1.00 |
| Clove bud oil | 3.50 |
| Jasmine complex | 10.00 |
| Rose complex | 8.00 |
| Isobutyl salicylate | 7.00 |
| Cinnamic alcohol | 5.00 |
| Heliotropin | 10.00 |
| Coumarin | 5.00 |
| Resin aroma of tonka bean | 2.00 |
| Methyl nonyl acetic aldehyde | 1.50 |

The components and proportions in the perfume compositions of this example can be adjusted according to methods well known in the perfume art to form a wide variety of desirable perfume compositions containing odoriferously effective amounts of these compounds.

EXAMPLE IV

Soap Bar Composition

A conventional household soap bar having the following composition is prepared:

| Component | Percent by Weight |
| --- | --- |
| Sodium soap | 75.0 |
| Potassium soap | 7.5 |
| (The total soap comprises a mixture of 80% tallow soap and 20% coconut soap) | |
| Water | 15.0 |
| Perfume Composition A of Example III | 2.5 |
| TOTAL | 100.0 |

This soap bar exhibits a desirable narcissus fragrance. Composition B can be substituted for Composition A in the above soap bar composition to attain a chypre fragrance.

EXAMPLE V

Detergent Compositions

A conventional, granular, heavy-duty built detergent having the following composition is prepared:

| Component | Percent by Weight |
| --- | --- |
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |

| | |
|---|---|
| Water | 9.8 |
| Perfume Composition A of Example III | 0.2 |
| TOTAL | 100.0 |

The detergent composition exhibits a desirable narcissus fragrance. Composition B of Example III can be substituted for Composition A to attain a highly desirable chypre fragrance.

What is claimed is:

1. Dihydro-β-santalol having the general formula

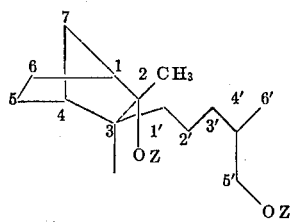

2. A process for preparing dihydro-β-santalol from 3-endo-methyl-3-exo(4'-methyl-5'-hydroxypentyl)norcamphor comprising the steps of:

1. reacting 3-endo-methyl-3-exo(4'-methyl-5'-hydroxypentyl)norcamphor with a material selected from the group consisting of sodium metal and sodium hydride in a molar ratio of sodium metal or sodium hydride to norcamphor compound of from about 0.9:1 to about 1:0.9; and subsequently reacting the product so obtained with an organometallic compound selected from the group consisting of methylmagnesium bromide, methylmagnesium iodide, methylmagnesium chloride, methyl sodium, methyl lithium and methyl potassium, said reaction with the organometallic compound taking place in a solvent selected from the group consisting of diethyl ether, tetrahydrofuran, dioxane, 1,2-dimethoxyethane and bis-(2-methoxyethyl)ether, with a molar ratio of methyl Grignard to norcamphor compound of from about 2:1 to about 6:1; or a molar ratio of methyl sodium, methyl potassium or methyl lithium to norcamphor compound of from about 2:1 to about 5:1 and a weight ratio of solvent to norcamphor compound of from about 5:1 to about 40:1, said reaction with the organometallic compound taking place at temperatures ranging from about 15° to about 120° C under an inert atmosphere for a period of from about one to about 24 hours;

2. hydrolyzing the reaction product obtained from Step (1); and 3. dehydrating the reaction product obtained from Step (2) with a compound selected from the group consisting of Lewis acids, oxalic acid, p-toluenesulfonic acid, sulfuric acid, hydrochloric acid and hydrobromic acid to obtain dihydro-β-santalol.

3. The process of claim 2 wherein, in Step 3, a solvent is utilized in amounts ranging from about 700 ml. to about 1,500 ml. per mole of 2-exo-3-endo-dimethyl-3-exo(4'-methyl-5'-hydroxpentyl)norborneol and is selected from the group consisting of benzene, toluene, tetrahydrofuran, 1,2-methoxyethane, bis-(2-methoxyethyl)ether, and dioxane.

4. The process of claim 3 wherein, in Step 3, the reaction mixture is maintained at temperatures ranging from 15° to 100° C. for from about 1 to about 24 hours.

5. The process of claim 4 wherein, in Step 3, the Lewis acid is selected from the group consisting of aluminum chloride, boron trifluoride, stannic chloride, zinc chloride, ferric chloride, titanium tetrachloride, zinc bromide, magnesium bromide, and boron tribromide and is utilized in a mole ratio of Lewis acid to 2-exo-3-endo-dimethyl-3-exo(4'-methyl-5'-hydroxypentyl)norborneol of from about 0.25:1 to about 1:1.

6. The process of claim 4 wherein, in Step 3, oxalic acid and p-toluenesulfonic acid are utilized in aqueous solutions ranging from saturated to 1 percent aqueous solutions, by weight, of oxalic acid or p-toluenesulfonic acid and wherein, in Step 3, sulfuric acid, hydrochloric acid, and hydrobromic acid are utilized in aqueous solutions containing from 1 to 5 percent of these acids by weight of the acid solution.

7. The process of claim 6 wherein the oxalic acid, p-toluenesulfonic acid, sulfuric acid, hydrochloric acid, and hydrobromic acid are utilized herein in a mole ratio of acid to 2-exo-3-endo-dimethyl-3-exo(4'-methyl-5'-hydroxypentyl)norborneol of from 0.5:1 to 20:1.

* * * * *

UNITED STATES PATENT OFFICE
CERTIFICATE OF CORRECTION

Patent No. 3,673,263  Dated July 28, 1972

Inventor(s) Wayne I. Fanta & William F. Erman

It is certified that error appears in the above-identified patent and that said Letters Patent are hereby corrected as shown below:

Column 1, line 45, "(4'-5-'-hydroxpentyl)" should read -- (4'-methyl-5'-hydroxypentyl) --.

Column 5, line 39, "either" should read -- ether --.

Column 6, line 24, "base e.g." should read -- base (e.g., --.

Column 8, line 61, "is" should be -- in --.

Column 9, line 5, "the" should be -- then --.

Column 11, lines 13-21, delete the structure and insert the following structure:

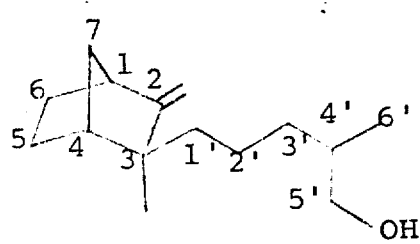

Signed and sealed this 2nd day of January 1973.

(SEAL)
Attest:

EDWARD M. FLETCHER, JR.
Attesting Officer

ROBERT GOTTSCHALK
Commissioner of Patents